United States Patent

[11] 3,578,806

| [72] | Inventor | Roger R. Tonelli |
| | | Chicago, Ill. |
| [21] | Appl. No. | 799,179 |
| [22] | Filed | Feb. 14, 1969 |
| [45] | Patented | May 18, 1971 |
| [73] | Assignee | Radio Steel & Mfg. Co. |
| | | Chicago, Ill. |

[54] TRAILER AND UNDERCARRIAGE THEREFOR
5 Claims, 7 Drawing Figs.

[52] U.S. Cl. .................................................. 298/2,
280/106, 280/490, 298/17
[51] Int. Cl. .................................................. B60p 1/24
[50] Field of Search ......................................... 298/5, 2;
280/106 (T), 63, 414, 408, 204, 116, 490, 47.24, 47.26

[56] References Cited
UNITED STATES PATENTS

| 1,046,258 | 12/1912 | Bruner | 280/116X |
| 1,535,891 | 4/1925 | Arndt | 280/116 |
| 2,506,139 | 5/1950 | Crosley | 298/5 |
| 3,014,545 | 12/1961 | Shepley | 280/490UX |

*Primary Examiner*—Richard J. Johnson
*Attorney*—McDougall, Hersh, Scott & Ladd

ABSTRACT: A trailer having an undercarriage formed from flat strip material which has an adjustable hitch on its front end and carries a self-dumping dump body is provided. A latch on the dump body is engageable with a cooperating member and need not be accurately registered therewith.

INVENTOR
Roger R. Tonelli
by McDougall, Hersh, Scott
and Ladd
Att'ys

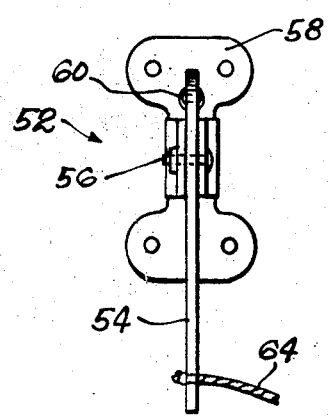
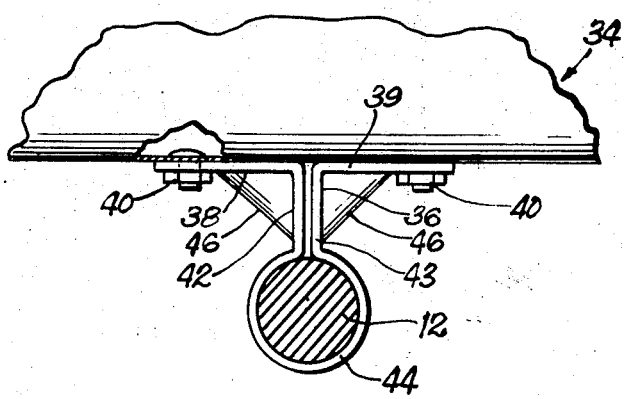
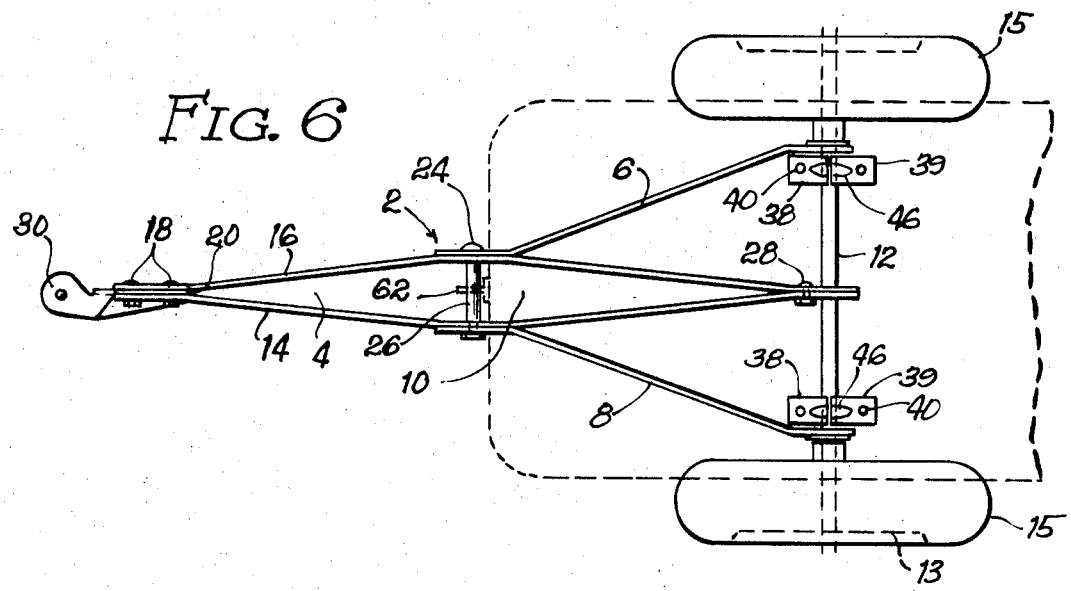
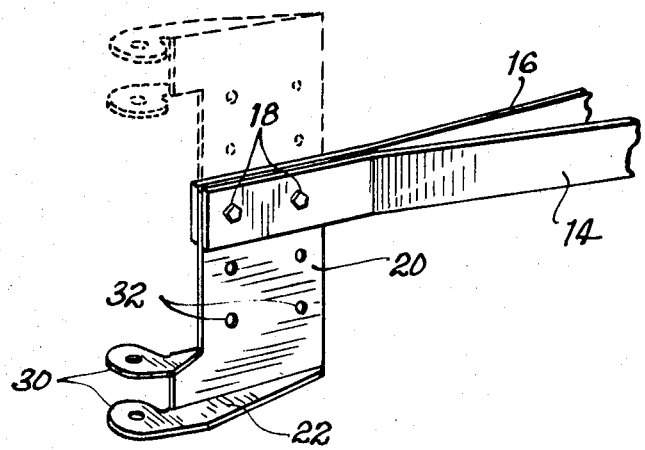

TRAILER AND UNDERCARRIAGE THEREFOR

BACKGROUND OF THE INVENTION

This invention relates generally to vehicles of the trailer type. More specifically it relates to an improved undercarriage and body for such vehicles.

In recent years there has been a growing need for trailer-type vehicles for use with small tractors and other types of towing vehicles used by homeowners and others having the need to transport material and articles over the relatively short distances in rural or suburban homes and industrial or other commercial properties. A trailer adequate to meet all the needs of these types of potential uses should be economical to construct and sell, rugged and yet relatively simple in its construction and operation and additionally it is very frequently desirable that it be constructed in such a way as to be susceptible of being shipped in a knocked-down form and assembled by the user.

Therefore, it is an object of this invention to provide a novel trailer which is relatively inexpensive to fabricate and yet at the same time has sufficient strength to be durable for a long period of time.

It is another object of this invention to provide a novel trailer which is relatively strong in its construction and is therefore easy to assembly and maintain.

These and other objects of the invention are achieved in one embodiment of the invention in which the undercarriage of a trailer is constructed out of flat strip material capable of easy assembly into a structure having sufficient strength to withstand the forces applied by towing, the weight of the load and travel over uneven surfaces. In another aspect of the invention there is provided means for hitching the trailer to a towing vehicle which hitch includes means adjustable over a wide range permitting the use of the trailer with a wide variety of towing vehicles and towing conditions. In still another aspect of the invention a dump body is provided on the undercarriage dimensioned and positioned to self-dumping when a normally engaged latch maintaining it parallel to the undercarriage is released.

The subject matter which is regarded as the invention is particularly pointed out and distinctly claimed in the concluding portion of this specification. An embodiment of the invention, both as to its structure and means of operation, for the purposes of exemplification, together with further objects and advantages thereof may be best understood by reference to the following description taken in connection with the accompanying drawings in which:

FIG. 4 is a front view of the latch forming a part of the invention;

FIG. 5 is a partial cutaway view illustrating the manner of attaching the dump body to the undercarriage;

FIG. 6 is a top plan view of a trailer in accordance with the invention with the dump body removed but its outline shown in dotted lines; and FIG. 7 is a detailed view of the hitch forming a part of the invention showing in dotted lines an alternative position of the hitch.

Figure 1:
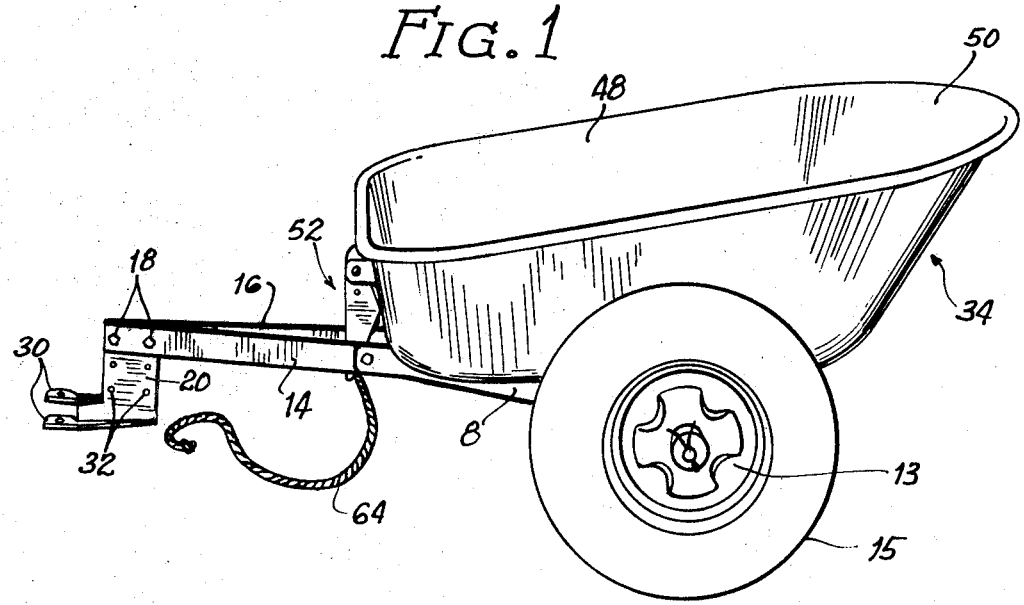
FIG. 1 is a side view of trailer incorporating the invention.

Referring first to FIG. 6, a trailer in accordance with the invention is constituted by an undercarriage 2 having a main frame 4 and a pair of braces 6 and 8. The braces are attached to the main frame at an intermediate portion 10 thereof and diverge outwardly and engage an axle 12 which passes through appropriate openings in their diverged ends.

Wheels 13 and 15 are rotatably mounted on the axle 12 preferably by means of ball bearings and in the illustrated embodiment are provided with pneumatic tires.

The main frame 4 is formed by two members in the form of flat strips fabricated from any material of suitable strength such as steel. At their forward ends the members 14 and 16 are joined together by bolts and nuts 18 passing through them and also the bracket 20 of a hitch 22. From this forward end the members 14 and 16 diverge to the intermediate portion 10 where they and the braces 6 and 8 are held together by a bolt and nut 24 passing through them as well as through a hollow cylindrical spacer 26. The spacer 26 maintains the members 14 and 16 spread apart and also functions in cooperation with a latch to be described hereinafter. Rearward of the intermediate portion 10, the members 14 and 16 converge toward each other and are held at their rearward ends by a nut and bolt 28. These ends are provided with openings through which the axle 12 may pass and in this manner engage the axle.

Referring to FIG. 7, the hitch 22 is provided with a pair of horizontally extending lugs 30 which are apertured. These lugs may be placed on opposite sides of the drawbar or other cooperating hitch member on a towing vehicle and a drawpin (not shown) passed through the apertures and the drawbar to attach the trailer to the vehicle. The bracket 20 of the hitch is provided with a plurality of spaced openings 32 through which the nuts and bolts 18 may be passed to attach the hitch to the undercarriage. By selecting the appropriate set of openings 32 when attaching the hitch the user may adjust the height of the undercarriage to cause it to ride level with the drawbar of the towing vehicle or provide any needed compensation for sloping terrain conditions. Although the hitch in FIG. 7 shows three pairs of holes 32 it may be seen that six levels of adjustment are provided for by inverting the hitch to the dotted line position shown in FIG. 7.

Figure 2:
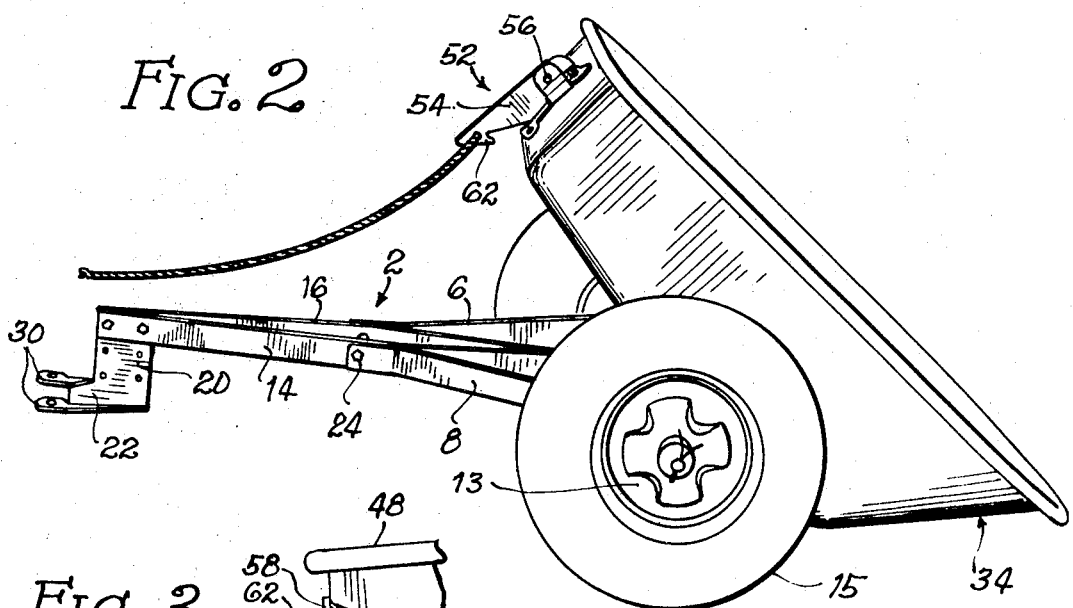
FIG. 2 is a view similar to FIG. 1 showing the trailer in its dumping position.

Referring to FIGS. 1 and 2 the drawing illustrates a dump body 34 forming a part of the invention. The dump body as may be seen in FIG. 5 is pivotally mounted on the undercarriage 2 by a pair of identical split brackets 36. At their split ends 38 and 39 the brackets extend horizontally and are secured to the dump body by nuts and bolts 40. The brackets are further formed with vertically extending portions 42 and 43 and are closed by a circular portion 44 which in the assembled position encompass the axle 12 relatively loosely to permit the pivoting of the dump body. As may be seen in FIG. 6, the brackets 36 are formed with sufficient width so that strengthening ribs 46 may be provided.

The dump body 34 extends transversely of the axle 12. A first portion 48 extends forward of the hitch 20 while a second portion 50 extends rearwardly. As may be seen in FIGS. 1 and 2, the portion 50 is constructed to have higher sides than the portion 48. As seen in the drawing, the sides rise upwardly from the front end to the rear end. The dimensions are selected to be such that the portion 50 has a greater weight than the portion 48 and so exerts a force tending to tip the dump body rearwardly to dump its contents when desired. This tipping force is of course increased when the dump body is loaded with the material inasmuch as a user will tend to put more material in the portion 50 for as is pointed out, its sides are higher.

The portion 50 is provided with a rear end or nose 51 which has an angle of inclination with respect to the supporting surface which is selected so that when the dump body is in the dumping position as seen in FIG. 2, it is parallel or substantially parallel to the ground so that very little material remains in the dump body.

Figure 3:
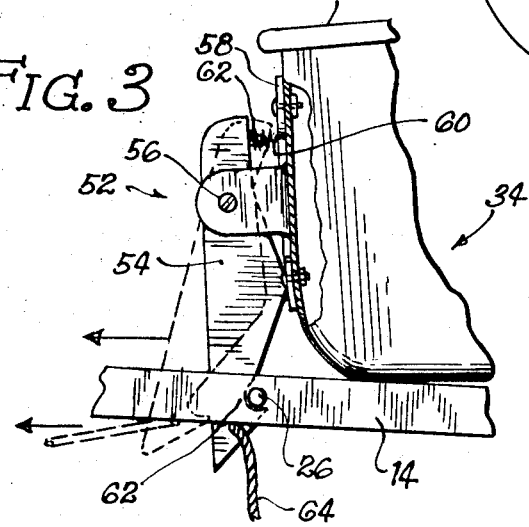
FIG. 3 is a partial cutaway side view showing in dotted lines the operation of the latch.

In order to maintain the dump body 34 in a level position while loading and transporting the front end of its first portion 48 carries a latch 52. As may be best seen in FIG. 3 the latch 52 is constituted by a lever 54 pivoted at 56 on a bracket 58 secured to the front end of the portion 48 by threaded bolts. A compression spring 60 is mounted between the upper end of the lever 54 above the pivot 56 and the bracket 58. The spring 60 is held in position by virtue of its engagement with a finger 62 extending from the lever and urges the lever in a counterclockwise direction as seen in FIG. 3 to force a hook 62 on the lower end of the lever into engagement with the spacer 26 thereby maintaining the dump body in a level position. When it is desired to dump the load, a rope 64 or other similar device activated by the user from the towing vehicle can be pulled releasing the hook 62 from the spacer 26 permitting the tipping force exerted by the portion 50 and the load therein to be effective. Once the load has been dumped the rope 64 can be pulled by the user rotating the dump body back to the level position in which the hook 62 automatically engages the spacer 26 by virtue of the force exerted by the spring 60.

The novel construction provided offers a number of advantages. The use of flat strip material for the undercarriage results in a structure which is relatively economical to fabricate and yet at the same time is sufficiently rugged to support substantial loads without sag or sway. The hitch is easily adjustable to a number of different heights because of the ability to mount the bracket 20 either above or below the main frame. The latch 52 offers the advantage being able to engage anywhere along the spacer 26 without having to have relatively precise registration with a notch or similar type of construction.

The entire trailer and its dump body because of its unique construction involving among other things the use of the flat strip material has the additional advantage of being shippable in a disassembled or knocked-down form for easy assembly by a purchaser or user.

It will be understood that various changes and modifications can be made in the above described structure which provide the characteristics of this invention without departing from the spirit thereof particularly as defined in the following claims.

I claim:

1. A trailer having a single axle; wheels rotatably mounted on said axle at opposite ends thereof; an undercarriage comprising a main frame having a pair of members secured to each other at a first end thereof, diverging from each other from said first end to an intermediate portion; a spacer mounted between said members at said intermediate portion; said members converging toward each other from the intermediate portion to a second end; said members secured to each other and engaging said axle intermediate its ends at said second end; and a pair of braces each secured at one end to said main frame at the intermediate portion, on opposite sides thereof each diverging outwardly and engaging said axle adjacent an end thereof; a hitch on said first end of said main frame for attaching the trailer to a drawing vehicle and wherein said braces are formed from flat strip material and are disposed to have their greatest transverse dimension normally extending vertically with respect to a supporting surface.

2. A trailer having a single axle; wheels rotatably mounted on said axle at opposite ends thereof; an undercarriage comprising a main frame having a pair of members secured to each other at a first end thereof diverging from each other from said first end to an intermediate portion; a spacer mounted between said members at said intermediate portion; said members converging toward each other from the intermediate portion to a second end; said members secured to each other and engaging said axle intermediate its ends at said second end; and a pair of braces each secured at one end to said main frame at the intermediate portion on opposite sides thereof, each diverging outwardly and engaging said axle adjacent an end thereof; a hitch on said first end of said main frame for attaching the trailer to a drawing vehicle; and a dump body having a bottom and upwardly extending sides and pivotably mounted on said axle; said dump body having a first portion extending from said axle in one direction and overlying said undercarriage and a second portion extending from said axle in the other direction and having a weight greater than that of said first portion so as to exert a force urging said dump body to pivot about said axle.

3. The combination of claim 2 including a latch means releasably holding said dump body to said undercarriage in opposition to the force exerted by said second portion.

4. The combination of claim 3 wherein said latch means comprises a lever pivoted on the forward end of said first portion and having a hook at its free end engageable with said spacer.

5. The combination of claim 4 where said latch means further includes a spring connected between said lever and the forward end of said first portion urging said hook into engagement with said spacer.